United States Patent
Iijima et al.

(10) Patent No.: US 10,423,613 B2
(45) Date of Patent: Sep. 24, 2019

(54) DATA SEARCH METHOD AND DATA SEARCH SYSTEM

(71) Applicant: Hitachi, Ltd., Chiyoda-ku, Tokyo (JP)

(72) Inventors: Michio Iijima, Tokyo (JP); Natsuko Sugaya, Tokyo (JP); Atsushi Hatakeyama, Tokyo (JP)

(73) Assignee: HITACHI, LTD., Tokyo (JP)

( * ) Notice: Subject to any disclaimer, the term of this patent is extended or adjusted under 35 U.S.C. 154(b) by 1015 days.

(21) Appl. No.: 14/767,658

(22) PCT Filed: Dec. 20, 2013

(86) PCT No.: PCT/JP2013/084249
§ 371 (c)(1),
(2) Date: Aug. 13, 2015

(87) PCT Pub. No.: WO2015/092914
PCT Pub. Date: Jun. 25, 2015

(65) Prior Publication Data
US 2016/0004745 A1    Jan. 7, 2016

(51) Int. Cl.
*G06F 16/00* (2019.01)
*G06F 16/242* (2019.01)
(Continued)

(52) U.S. Cl.
CPC .......... *G06F 16/243* (2019.01); *G06F 16/248* (2019.01); *G06F 16/24575* (2019.01);
(Continued)

(58) Field of Classification Search
CPC .......................... G06F 17/30401; G06F 16/243
(Continued)

(56) References Cited

U.S. PATENT DOCUMENTS 8,024,332 B2 * 9/2011 Cao ........................ G06F 16/338
707/728
8,515,986 B2 * 8/2013 Salvetti ............... G06F 16/3329
707/768

(Continued)

FOREIGN PATENT DOCUMENTS

JP    11-143902        5/1999
JP    2005-063158     3/2005
(Continued)

OTHER PUBLICATIONS

PCT International Search Report on application PCT/JP2013/084249 dated Feb. 25, 2014; 4 pages.

*Primary Examiner* — Chelcie L Daye
(74) *Attorney, Agent, or Firm* — Foley & Lardner LLP

(57) ABSTRACT

A data search method and system are provided in which data including a suitable reply to a query can be retrieved through a concept search. A data search method for searching for a text group that is similar to an inquiry text from data storing a plurality or text groups into which a plurality of texts are grouped includes: obtaining first information that is likely to be a search object and an appearance frequency of the first information with respect to each of the text groups and classifying the first information as second information that is a search object if the appearance frequency of the first information is less than or equal to a predetermined frequency; extracting third information included in the inquiry text; searching for the third information from the second information with respect to each of the text groups; and outputting the identifiers of a predetermined number of text groups with a higher number of hits on the third information included in the inquiry text.

10 Claims, 10 Drawing Sheets

(51) Int. Cl.
*G06F 16/248* (2019.01)
*G06F 16/28* (2019.01)
*G06F 16/2457* (2019.01)
*G06F 16/33* (2019.01)

(52) U.S. Cl.
CPC ...... *G06F 16/24578* (2019.01); *G06F 16/285* (2019.01); *G06F 16/3344* (2019.01); *G06F 16/3346* (2019.01)

(58) Field of Classification Search
USPC .......................................................... 707/723
See application file for complete search history.

(56) References Cited

U.S. PATENT DOCUMENTS

| | | | |
|---|---|---|---|
| 9,626,622 B2 * | 4/2017 | Allen | .................... G06F 16/907 |
| 2006/0078862 A1 | 4/2006 | Goto et al. | |

FOREIGN PATENT DOCUMENTS

| | | |
|---|---|---|
| JP | 2005-301856 | 10/2005 |
| JP | 2006-092473 A | 4/2006 |
| JP | 2010-009307 A | 1/2010 |

* cited by examiner

FIG.9

| STRING | CURRENT CONDITION | ENTIRE WEIGHT | WEIGHT CHANGE |
|---|---|---|---|
| SQL TRACE | 1 | – | ◀◀ ◀ ■ ▶ ▶▶ |
| DB PRODUCT C | 1 | – | ◀◀ ◀ ■ ▶ ▶▶ |
| : | : | : | : |
| COMPANY B | 2 | 0.1 [NO CONSTRAINT] | ◀◀ ◀ ■ ▶ ▶▶ |
| SOLUTION CASE | – | 2 [NO CONSTRAINT] | ◀◀ ◀ ■ ▶ ▶▶ |
| : | : | : | : |

CALL CENTER ASSISTANCE SYSTEM SETUP SCREEN
- WEIGHTING SETTING | EXECUTE INDEX CREATION | INDEX SETTING
- Y3 — Undo | RETURN TO SEARCH RESULT | FIX CHANGE | Redo — Y4
- SELECT FILE (Y1) | OUTPUT TO FILE (Y2)
- C

FIG.10

| STRING | CURRENT CONDITION | ENTIRE WEIGHT | WEIGHT CHANGE | CATEGORY |
|---|---|---|---|---|
| SQL TRACE | 1 | – | ◀◀◀■▶▶▶ | : |
| DB PRODUCT C | 1 | – | ◀◀◀■▶▶▶ | PRODUCT NAME |
| : | : | : | : | : |
| COMPANY B | 2 | 0.1 NO CONSTRAINT | ◀◀◀■▶▶▶ | : |
| SOLUTION CASE | – | 2 NO CONSTRAINT | ◀◀◀■▶▶▶ | STATUS |
| : | : | : | : | : |

CALL CENTER ASSISTANCE SYSTEM SETUP SCREEN
WEIGHTING SETTING | EXECUTE INDEX CREATION | INDEX SETTING

Y3 — Undo | RETURN TO SEARCH RESULT | FIX CHANGE | Redo — Y4

SELECT FILE | OUTPUT TO FILE

Y1   Y2

DATA SEARCH METHOD AND DATA SEARCH SYSTEM

TECHNICAL FIELD

The present invention relates a data search method and a data search system for searching for data that is a search object.

BACKGROUND ART

Heretofore, there have been various systems using a data search scheme. For example, a call center assistance system is one example of such systems. In the call center assistance system, query and response data such as mails about diversified inquiries, which have been handled in the past, are stored as operations records in a database. A person in charge at the call center is required to answer by retrieving a suitable reply to a query from a user as soon as possible, while searching for past referential data without regard to skill and knowledge. However, doing so is difficult for a person in charge without skill and knowledge, as a huge amount of inquiry data and response data is stored in a database.

When a person in charge retrieves referential data from past operations records, a method of selecting a suitable keyword and performing a search is conceivable. By carrying out a search using a keyword, a person in charge can reply to a query from a user more rapidly. However, a person in charge must have skill and knowledge to select a suitable keyword. In view of such a problem, for example, in Patent Literation 1, carrying out a data search without selecting a keyword is made feasible by executing a concept search with an inquiry text from a customer specified for search criteria as is.

CITATION LIST

Patent Literature

Patent Literature 1: Japanese Unexamined Patent Application Publication No. Hei 11-143902

SUMMARY OF INVENTION

Technical Problem

There are two methods of using a conventional concept search: one method that regards operations records comprised of a series of past mails as one data unit and the other method that regards each past mail as one data unit. However, in Patent Literature 1, when a concept search is applied to past operations records which are presumed currently, a search noise is induced by each of the above methods.

The reason is described below. For example, in the former method, a series of operations records beginning with data when the operator begins to identify a problem may include data of subsequent communication involving trial and error and the like. In such a case, words that characterize individual data units are present together in the data of the operations records, which may result in a search noise, as unintended data is acquired. Also in the latter case, each individual past mail often includes multiple appearances of a word that characterizes a series of operations records and a search noise, likewise in the former, may occur influenced by a particular word. Therefore, in related art like Patent Literation 1, there has been a problem in which it is difficult for a person in charge to retrieve data including a suitable reply to an inquiry that the person received through a concept search.

The present invention has been developed in view of the foregoing and an object of the invention is to provide a data search method and a data search system in which data including a suitable reply to an inquiry can be retrieved through a concept search.

Solution to Problem

In order to solve the abovementioned problem and achieve the object, a data search method pertaining to the present invention is a data search method for searching for a text group that is similar to an inquiry text from data storing a plurality of text groups into which a plurality of texts are grouped and is understood as a data search method including: obtaining first information that is likely to be a search object and an appearance frequency of the first information with respect to each of the text groups and classifying the first information as second information that is a search object if the appearance frequency of the first information is less than or equal to a predetermined frequency; extracting third information included in the inquiry text; searching for the third information from the second information with respect to each of the text groups; and outputting the identifiers of a predetermined number of text groups with a higher number of hits on the third information included in the inquiry text.

The present invention is also configured as a data search system that carries out the above data search method.

Advantageous Effects of Invention

According to the present invention, it is possible to retrieve data including a suitable reply to a query through a concept search.

BRIEF DESCRIPTION OF DRAWINGS

FIG. 9 is a diagram depicting an example of a criteria setup screen for setting weights of strings.

FIG. 10 is a diagram depicting an example of a case of setting a weighting value for a unit of categorized strings.

DESCRIPTION OF EMBODIMENTS

In the following, embodiments of a data search method and system pertaining to the present invention will be described in detail with reference to the accompanying drawings.

Figure 1:
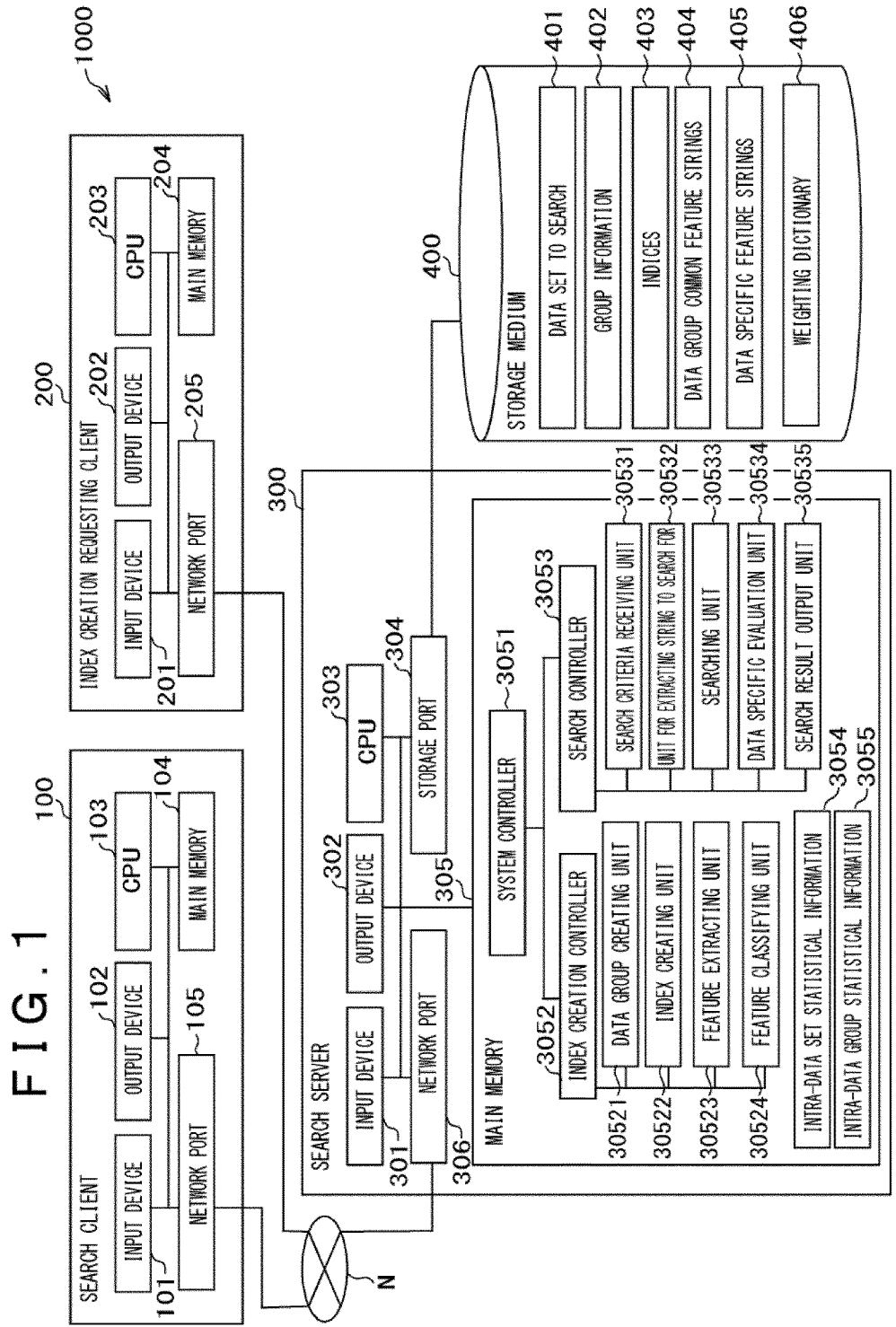
FIG. 1 is a diagram depicting the architecture of a search system to which a search server, a search method, and a search program pertaining to the present invention are applied.

FIG. 1 is a diagram depicting the architecture of a search system 1000 to which a data search method and system pertaining to the present invention are applied. As depicted in FIG. 1, the search system 1000 includes a search client 100, an index creation requesting client 200, and a search server 300 which are interconnected via a network N. The network N is, for example, a common public communications network such as the Internet.

The search client 100 is a terminal through which a user requests the search server 300 to retrieve data and receives data retrieved. The search client 100 is, for example, a common computer that includes, as hardware structure, an input device 101, an output device 102, a CPU 103, a main memory 104, and a network port 105 which are interconnected by a bus.

The input device 101 receives input of diversified data from a user. The output device 102 displays a result of diversified processing performed by the search server 300 and diversified data for execution of processing. The CPU 103 controls the operation of all components of the search client 100. The main memory 104 stores various programs for execution of operations and processing tasks which are performed on the search client 100. The network port 105 serves as an interface for communication with any other machine via the network N.

The index creation requesting client 200 is a terminal through which a user requests creation of an index that is used when data search is executed. Like the search client 100, the index creation requesting client 200 is configured from, for example, a common computer. It includes, as hardware structure, an input device 201, an output device 202, a CPU 203, a main memory 204, and a network port 205 which are interconnected by a bus. The functions of these components are the same as those of the corresponding components of the search client 100 and, therefore, their description is omitted here.

The search server 300 is a machine that receives a request from the search client 100, retrieves data, and outputs data retrieved. The search server 300 is, for example, a common server machine. It includes, as hardware structure, an input device 301, an output device 302, a CPU 303, a storage port 304, a main memory 305, and a network port 306 which are interconnected by a bus. The storage port 304 is a port for access to a storage medium 400. The storage medium 400 is configured from, for example, a common disk device. The functions of other components are the same as those of the corresponding components of the server client 100 and the index creation requesting client 102 and, therefore, their description is omitted here.

Although the storage medium 400 is physically separated from the search server 300 in the architecture of the present embodiment, it may be provided within the same housing. It may be an SSD (solid state drive), an HDD (hard disk drive), or any other storage device. Furthermore, although the search server 300, the search client 100, and the index creation requesting client 200 are physically separate ones in the architecture of the present embodiment, a subset or all of them may be provided in the same housing.

The main memory 305 of the search server 300 includes a system controller that controls the entire search server 300 and, moreover, the system controller 3051 functionally includes an index creation controller 3052 and a search controller 3053. The index creation controller 3052 includes a data group creating unit 30521, an index creating unit 30522, a feature extracting unit 30523, and a feature classifying unit 30524. The search controller 3053 includes a search criteria receiving unit 30531, a unit for extracting string to search for 30532, a searching unit 30533, a data specific evaluation unit 30534, and a search result output unit 30535. Moreover, the main memory 305 stores intra-data set statistical information 3054 and intra-data group statistical information 3055. These pieces of information may be stored on another storage medium other than the main memory 305. The functions of the abovementioned components will be described later.

The storage medium 400 stores a data set to search 401, group information 402, indices 403, data group common feature strings 404, data specific feature strings 405, and a weighting dictionary 406. These pieces of data may be stored in the main memory 305 or a physically separate storage medium. The data group common feature strings 404 are set per data group and the data specific feature strings 405 are set per data, which will be specifically described later. The weighting dictionary is not indispensable and may be dispensed with.

The index creation controller 3052 is a processing unit that executes processing which invokes the data group creating unit 30521, the index creating unit 30522, the feature extracting unit 30523, and the feature classifying unit 30524. The data group creating unit 30521 is a processing unit that executes processing to create a data group from respective data units in a data set to search it has read in, based on group information indicating a relation between a data unit and a group in which the data unit should be included (which data unit should be included in which group).

The index creating unit 30522 is a processing unit that executes processing to create an index for a data set to search 401 including data groups. The feature extracting unit 30523 is a processing unit that extracts a string that is likely to be a feature string from a data group. In the present embodiment, it extracts a string from data units included in a data group. For a method for extracting a string, a method of Patent Document 1 may be used or other methods may be used. Although information to search for which is included in data to search is represented as a string in the present embodiment, it is also possible for the search system to search for identification information or the like including a numerical value, symbol, code, etc.

The feature classifying unit 30524 is a processing that calculates an intra-data set appearance frequency and an intra-data group appearance frequency of a string that may be a feature string, classifies the string as a data group common feature string 404 or data specific feature string 405, and stores the string accordingly.

The search controller 3053 is a processing unit that executes processing which invokes the search criteria receiving unit 30531, the unit for extracting string to search for 30532, the searching unit 30533, the data specific evaluation unit 30534, and the search result output unit 30535. The search criteria receiving unit 30531 is a processing unit that acquires search criteria data and converts it to a format compatible with the unit for extracting string to search for 30532. The unit for extracting string to search for 30532 is a processing unit that extracts a criteria string (search criteria information), i.e., a string that is apt for search criteria from the search criteria data acquired. Although information to search for is represented as a string in the present embodiment, it is also possible for the search system to search for identification information or the like including a numerical value, symbol, code, etc. as is the case for the feature extracting unit 30523.

The searching unit 30533 is a processing unit that executes search processing using indices. The data specific evaluation unit 30534 is a processing unit, that acquires a result of a search executed by the searching unit 30533 and makes an evaluation on a per-data basis by comparing each data unit Included in data groups constituting a data group set obtained as the search result against the data group common feature strings 404 and the data specific feature strings 405. The search result output unit 30535 is a processing unit that rearranges the search result according to the evaluation created and transmits a result to the search client 100.

Figure 2:
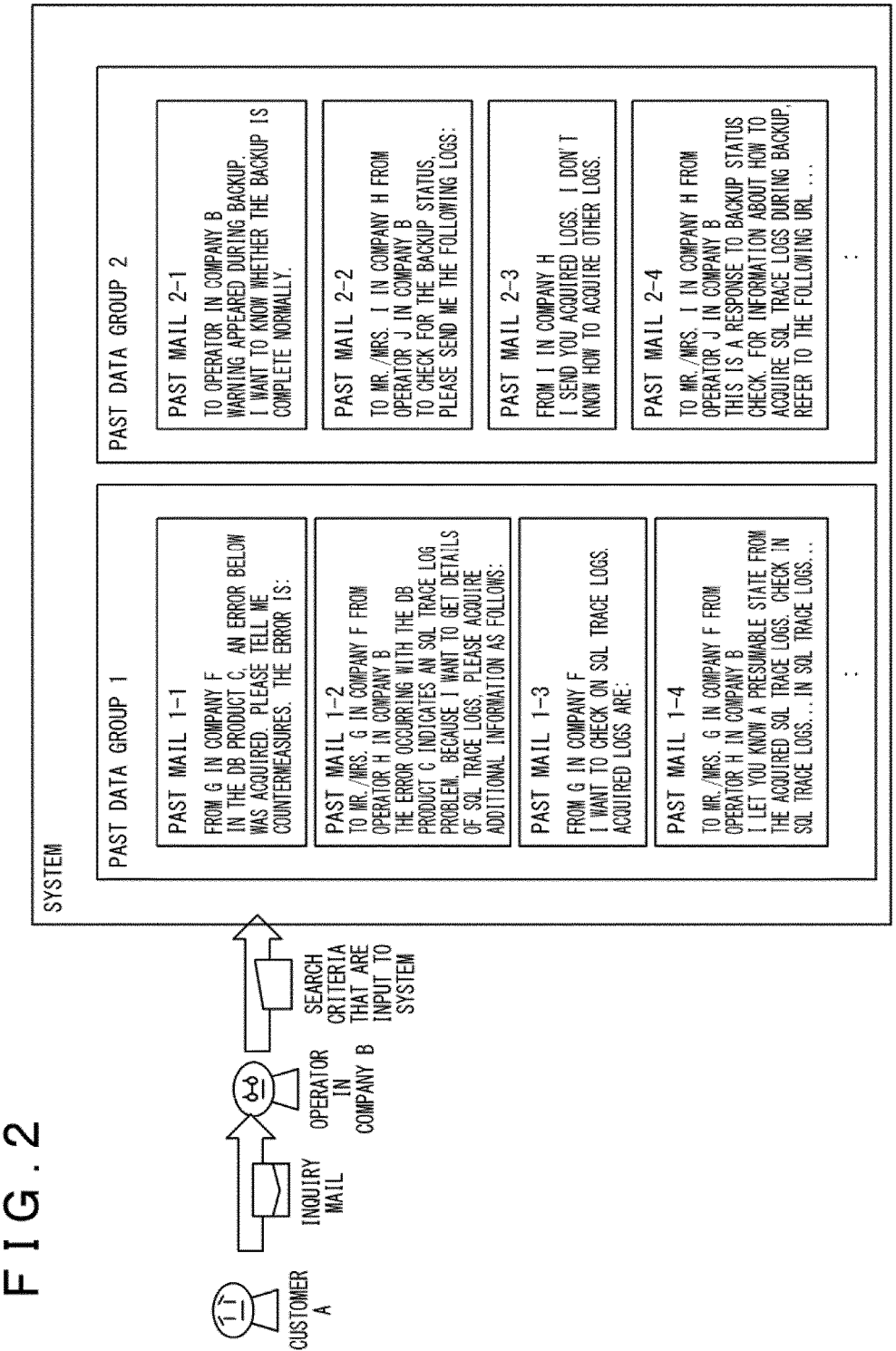
FIG. 2 is a diagram that explains what causes a search noise in a case where a concept search was executed on presumed data groups of data to search.
Figure 3:
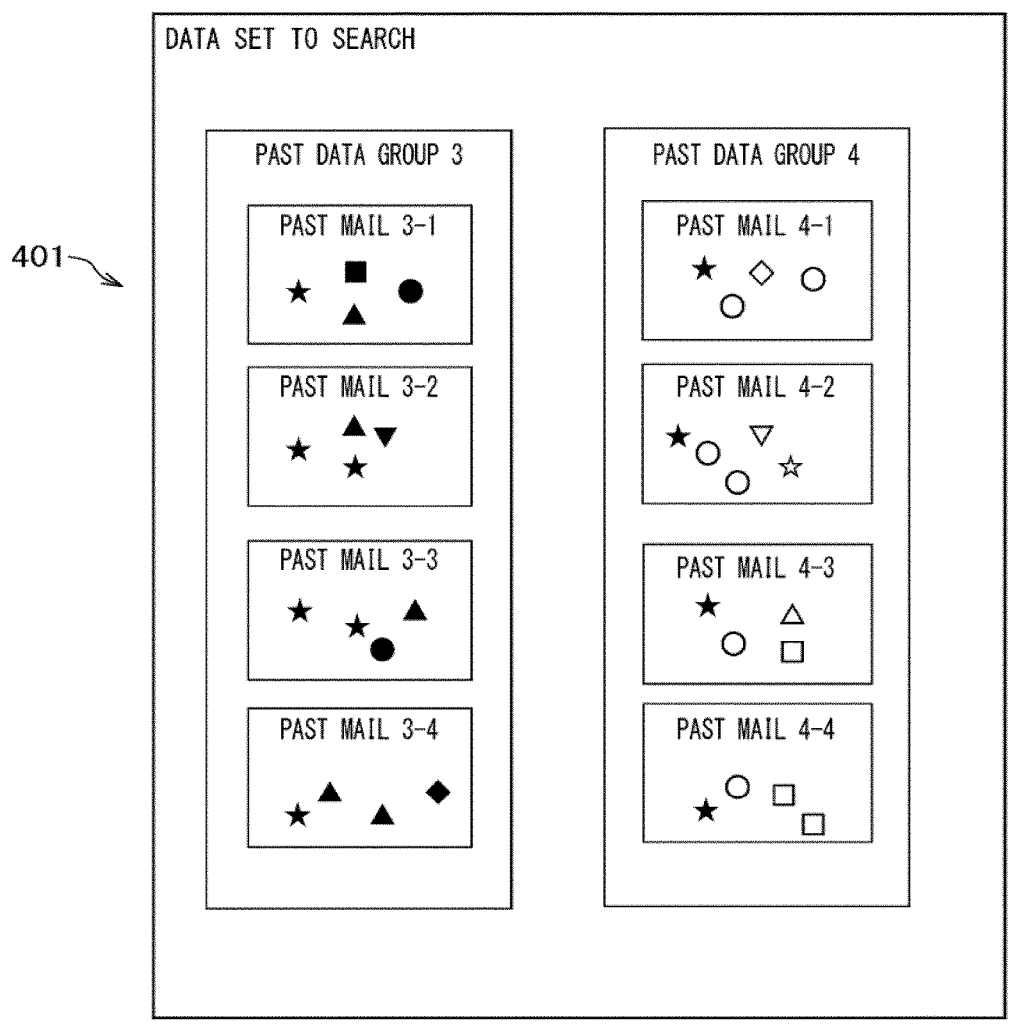
FIG. 3 is a diagram explaining a concept of classifying a string as a data group common feature string or data specific feature string in the present embodiment.
Figure 4:
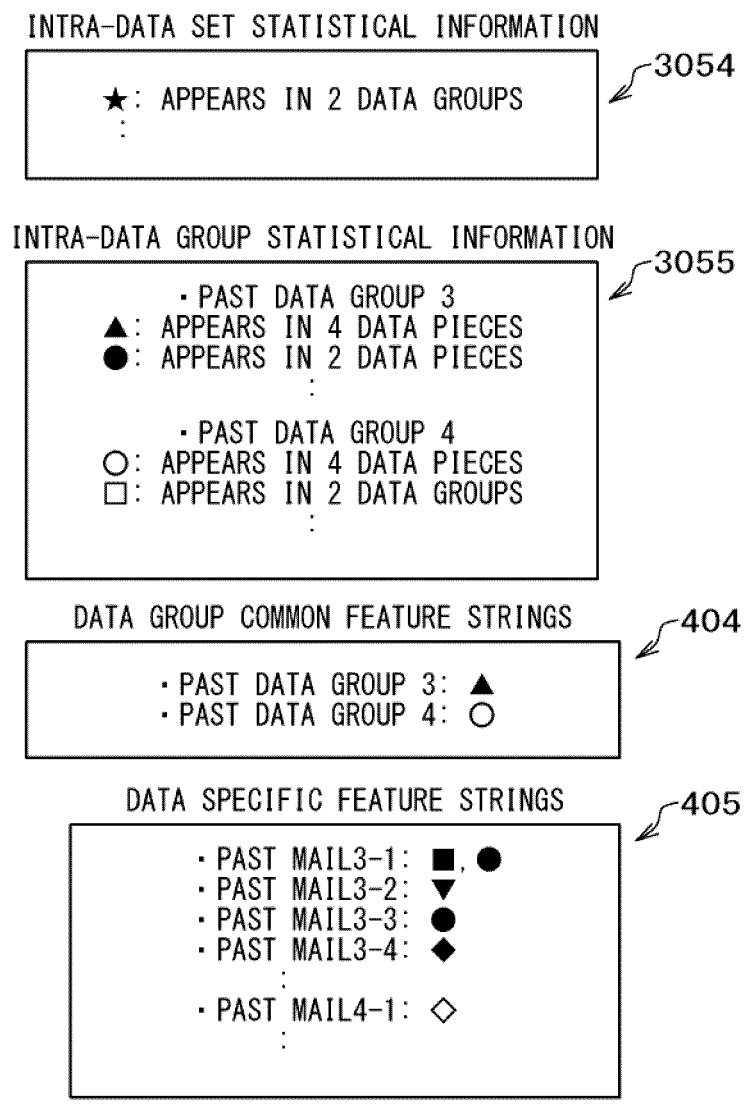
FIG. 4 is a diagram explaining the concept of classifying a string as a data group common feature string or data specific feature string in the present embodiment.

To begin with, an idea underlying the present embodiment is described first with the aid of FIGS. 2 through 4. FIG. 2 is a diagram that explains what causes a search noise in a case where a concept search was executed on presumed data groups of data to search. The following will explain two reasons why a search noise occurs in searching data to search (e.g., mails) divided into data groups (e.g., mail threads), taking an example of a conventional call center assistance system in which past response records are accumulated.

In this system, mails of inquiries are associated with mails of responses to the inquiries. Therefore, it is possible to perform a search in units of cases such as inquiries or responses. In FIG. 2, cases are represented as group data (past mail data groups 1, 2; e.g., mail threads) and mails are represented as data to search (past mails 1-1, 1-2, etc. and past mails 2-1, 2-2, etc.; e.g., mails).

Under such an assumption, let us suppose that customer A transmitted a mail that "To operator in Company B: please tell me how to acquire SQL trace logs of the DB product C of your company." and the center received the mail. Operator B in Company B who received the mail inputs an inquiry text as search criteria to the system to retrieve data of similar status from past response records. In an example depicted in FIG. 2, a text "Please tell me bow to acquire SQL trace logs of the DB product C of Company B." is input as search criteria.

In a method that regards operations records comprised of a series of past mails as one data piece, the operations records are a series of records beginning with data when the operator begins to identify a problem and also including data of subsequent communication involving trial and error and the like and the features of individual data units are present together in the data of the operations records. This gives rise of a search noise which will be explained below.

A past data group 1 into which the operations records are divided is response records in which the operator replies to a problem with SQL trace logs and a phrase "SQL trace logs" appears in the respective past mails in this group. Particularly, the phrase "SQL trace logs" is included in a feature string specific to the past data group, such as a past mail 1-1 "From G in Company F: in the DB product C, an error below was acquired. Please tell me countermeasures. The error is:", a past mail 1-2 "To Mr./Mrs. G in Company F from Operator H in Company B: the error occurring with the DB product C indicates an SQL trace log problem. Because I want to get details of SQL trace logs, please acquire additional information as follows:", and subsequent past malls 1-3, 1-4, etc. which are given in FIG. 2.

A past data group 2 into which the operations records are divided is response records in which the operator replies no a problem with backup and a word "backup" appears in the respective past mails in this group. Particularly, the word "backup" is included in a feature string specific to the past data group, such as a past mail 2-1 "To Operator in Company B: Warning appeared during backup. I want to know whether the backup is complete normally.", a past mail 2-2 "To Mr./Mrs. I in Company H from Operator J in Company B: To check for the backup status, please send me logs below:", and subsequent past mails 2-3, 2-4, etc. which are given in FIG. 2. Although a phrase "how to acquire SQL trace logs" is included in the past mail 2-4, inter alia, the word "backup" is a feature data unit overall and a phase "SQL trace" is regarded as low in importance.

To begin with, a first search noise is explained. The first search noise is a search noise that occurs when a conventional concept search is applied for a data set to search including data groups comprised of data units having a plurality of different subjects. In the example here, information that is desired to retrieve as a result of a search is how to acquire "SQL trace logs" recorded in the past mail 2-4 in the past data group 2. Therefore, it is desirable that Information that should be output to the operator from the system is the past mail 2-4 whose overall subject is SQL trace logs.

However, the past data group 1 is response records in which the operator replies to a problem with the SQL trace logs, the phrase "SQL trace" appears in the respective past mails in this group, and the phase "SQL trace logs" is included in a feature string specific to the past data group 1. Thus, the past mail group 1 has an overall subject of "SQL trace logs" and this phrase often appears in the individual data units; consequently, data in this group is output as a result with high priority to the abovementioned input. On the other hand, in the past data group 2, the phrase "how to acquire SQL trace logs" is included in the past mail 2-4, but the phase "SQL trace logs" is regarded as low in importance, as mentioned previously. Although the past mail 2-4 is a mail that should be output from the system in this example, the past data group 1 is evaluated high because it includes the phrase "SQL trace logs" which is one of the features of the search criteria and, consequently, a search noise occurs in a conventional concept search. Another possible way is evaluating the mails by a word "acquire" in the past data group 1. However, the call center frequently receives a request to acquire data among others and the word "acquire" is a string that appears frequently in mails. Therefore, it is difficult to regard this word as a feature that characterizes each data and a data group.

Next, a second search noise is explained. The second search noise is a search noise that occurs when a conventional concept search is applied for each data without grouping data. Even if each data was searched by a concept search, each data often includes multiple appearances of a word that characterizes a series of operations records; consequently, a search noise also occurs. For example, in FIG. 2, the past mail 1-2 includes two appearances of the phrase "SQL trace logs" and the past mail 1-4 includes three appearances of the phrase "SQL trace logs". Consequently, even if a conventional concept search is applied for single data, the past mails 1-2 and 1-4 among others are output, taking precedence over the past mail 2-4 in which the number of appearances of the phrase "SQL trace logs" is less and the mails other than the past mail 2-4 that should normally be output are output as an search noise. To prevent such a search noise from occurring, a feature string from among strings that are likely to be a feature string is classified in a method that will be described below.

FIGS. 3 and 4 are diagrams explaining a concept of classifying a string as a data group common feature string or data specific feature string in the present embodiment. An idea for classifying a string that is likely to be a feature string as a data group common feature string or data specific feature string is explained with the aid of FIGS. 3 and 4. FIG. 3 depicts a data set to search 401 as source data from which data is retrieved and FIG. 4 depicts intra-data set statistical information 3054, intra-data group statistical information 3055, data group common feature strings 404, and data specific feature string 405 as retrieved data.

In the data set to search 401, a past data group 3 including past mails 3-1 to 3-4 and a past data group 4 including past mails 3-1 to 3-4 are included. Here, strings that are likely to be feature strings are denoted by graphic symbol s such as asterisks (★, ☆) and squares (■, □) in a simplified manner. Through feature extraction processing which is executed by the feature extracting unit. 30523, strings denoted by the above graphic symbols are extracted.

Particularly, the feature extracting unit 30523 aggregates strings that are likely to be feature strings on a per data group basis. For example, because a string "★" appears in both past data groups, the feature extracting unit 30523 judges the string "★" as a string that appears commonly for these data groups, associates the string with the number of data groups in which it appeared, and stores this association as intra-data set statistical information 3054. The feature extracting unit 30523 similarly aggregates strings other than the string "★", associates a string (e.g., □) with the number of data groups (e.g., one data group), and stores this association.

Then, the feature extracting unit 30523 aggregates strings on a per data basis in each data group. For example, in a past data group 3, a string "▲" appears in four data units (past mails 3-1 to 3-4) and a string "●" appears two data units (past mails 3-1 and 3-3). In a past data group 4, a string "○" appears in four data units (past mails 4-1 to 4-4) and a string "□" appears in two data units (past mails 4-3 and 4-4). Thus, the feature extracting unit 30523 associates a string (e.g., ▲, ●) with the number of data units (e.g., 4 data units, 2 data units) in a data group (e.g., past data group 3) and stores this association as intra-data group statistical information 3055. The feature extracting unit 30523 similarly aggregates strings other than the above ones, associates a string with the number of data groups in each data group, and stores this association.

Among strings stored as infra-data set statistical information 3054, the feature extracting unit 30523 regards a string that appears in a larger number of data groups than a reference value, which is defined as a predetermined condition, as a string that represents a common, feature of the data set (data set common feature string). In the present example, if the above reference value is "2", a feature string "★" will be a data set common feature string.

Furthermore, among strings stored as intra-data group statistical information 3055, the feature extracting unit 30523 regards a feature that appears in a larger number of data units than a reference value, which is defined as a predetermined condition, as a data group common feature and stores it as a data group common feature string 404. The feature extracting unit 30523 manages data group common feature strings 404 for each data group, but excludes a data set common feature string (e.g., "★"). Accordingly, in the example presented in FIGS. 3 and 4, the feature extracting unit 30523 judges the string "▲" as a data group common feature string 404 in the past data group 3 and the string "○" as a data group common feature string 404 in the past data group 4.

Then, the feature extracting unit 30523 stores strings that remain after excluding a data set common feature string 404 (e.g., "★") and data group common feature strings 404 (e.g., "▲", "○") from the strings included in each data unit as data specific feature strings 405. Accordingly, in the example presented in FIGS. 3 and 4, the feature extracting unit 30523 stores feature strings "■" and "●" as data specific feature strings of the past mail 3-1. Also in the past mail 4-1, it stores data specific feature strings decided on the same basis. In this way, by focusing attention on data specific feature strings, it would become possible to evaluate feature strings specific to each data unit without being influenced by a feature specific to an entire data group.

Figure 5:
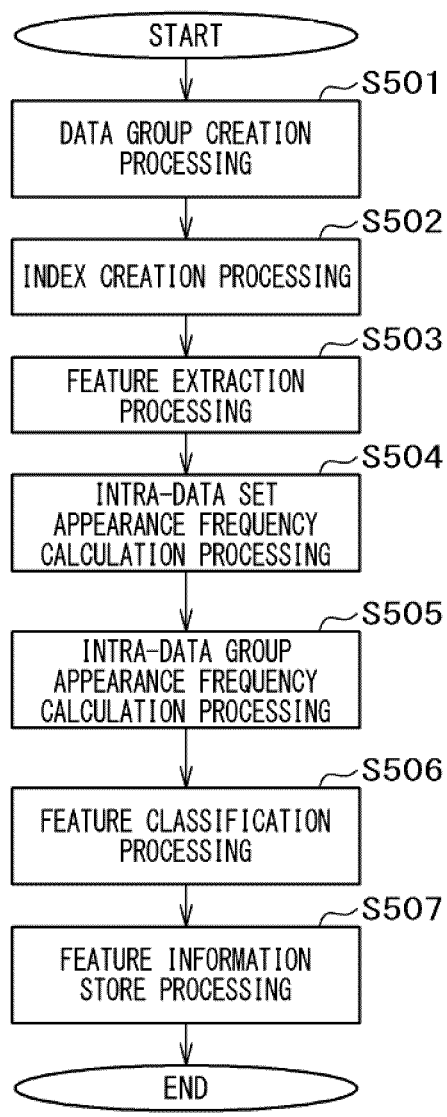
FIG. 5 is a flowchart illustrating a procedure of processing operations that are performed by each component of an index creation controller.
Figure 6:
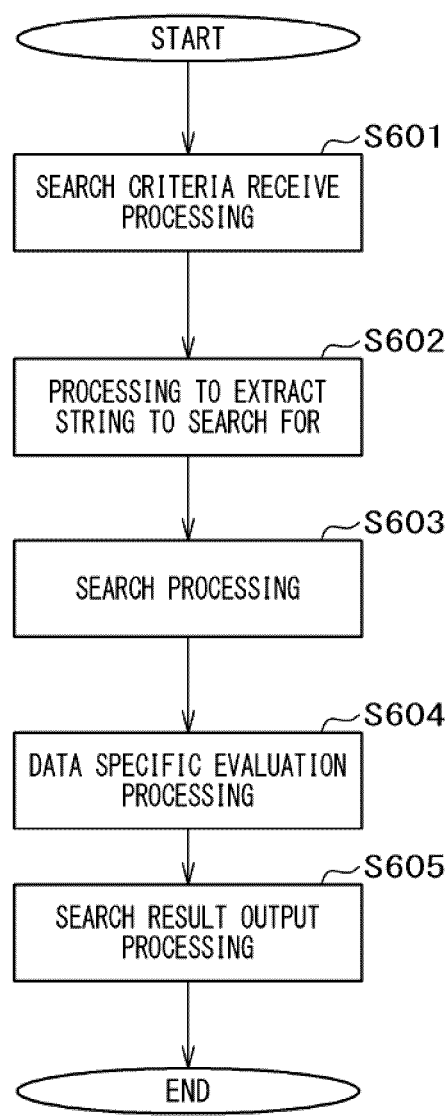
FIG. 6 is a flowchart illustrating a procedure of processing operations that are performed by each component of a search controller.

Next, processing operations that are performed by the search server 300 are described with FIGS. 5 and 6. FIG. 5 is a flowchart illustrating a procedure of processing operations that are performed by each component of the index creation controller 3052. In the following, it is assumed that, according to a request via the input device 201 of the index creation requesting client 200, an instruction to execute index creation processing is transmitted to the search server 300. An instruction to execute index creation processing is input by pressing an Execute Index Creation button in a search criteria setup screen which is depicted in FIG. 9 and will be described later or command input or any other input met tied and transmitted to the search server 300.

First, the system controller 3051 that received via the network port 306 an instruction to execute index creation processing from the index creation requesting client 200 invokes the index creation controller 3052. The index creation controller 3052 invokes the data group creating unit 30521, the index creating unit 30522, the feature extracting unit 30523, and the feature classifying unit 30524 in order. And, the data group creating unit 30521 executes data group creation processing (step S501).

Here, an example of group information 402 that is used in the data group creation processing is described below. The group information 402 is a table of a list (data ID list) form which associates a data group ID with data IDs. A data group TD is identification information to identify a data group. A data ID list is identification information to identify data units included in the corresponding data group ID.

For example, if a data group ID is #000001 and a data unit which is identified by a data ID of #00000001 and a data unit which is identified by a data ID of #00000002 are included in the data group, there is a data ID list associating "#000001" with "#00000001" and "#00000002". This data ID list is pre-stored in the storage medium 400.

In the data group creation processing, the data group creating unit 30521 reads in a data set to search 401 and group information 402 from the storage medium 400. And, referring to the group information 402, the data group creating unit 30521 acquires data units specified in a data ID list associated with a data group ID, creates a data group including these data units, and assigns a data group ID to the created data group; it thus creates a data group set including a plurality of data groups.

Once data groups have been created, the index creating unit 30522 executes index creation processing (step S502). While a full-text search index is created in the index creation processing, various methods which have heretofore been known, such as n-gram indexing and word indexing, can be used.

Once an index to data has been created, the feature extracting unit 30523 then executes feature extraction processing (S503). The feature extraction processing is a processing of extracting strings that are likely to be feature strings from the respective data units included in the data set to search 401. While strings can be extracted by various methods, by way of example, a method described in Patent Literature 1 can be used.

Once the strings that are likely to be feature strings have been extracted, the feature classifying unit 30524 executes intra-data set appearance frequency calculation processing, intra-data group appearance frequency calculation processing, feature classification processing, and feature information store processing (steps S504 to S507). From a functional perspective, these processing operations are executed respectively by subunits comprised in the feature classifying unit 30524; the subunits are, e.g., an intra-data set appearance frequency calculating subunit, an intra-data group appearance frequency calculating subunit, a feature classifying subunit, and a feature information storing subunit.

In the intra-data set appearance frequency calculation processing (step S504); for each of the strings extracted from the respective data units, the feature classifying unit 30524 acquires the number of data groups in which each string appears over the data set to search. For each of the extracted strings, the feature classifying unit 30524 associates each string with the acquired number of data groups in which it appeared and stores this association in the intra-data set statistical information 3054, as depicted in FIG. 4.

In the intra-data group appearance frequency calculation processing (step S505); for each of the strings extracted from the respective data units, the feature classifying unit 30524 acquires the number of data units in which each string appears in each data group. For each of the extracted strings, the feature classifying unit 30524 associates each string with the number of data units in which it appeared and stores this association in the intra-data group statistical information 3055, as depicted in FIG. 4.

In the feature classification processing (step S506), the feature classifying unit 30524 executes three processing operations as mentioned below. First, the feature classifying unit 30524 refers to the intra-data set statistical information 3054 stored in step S504 and classifies a string that appears in a larger number of data groups than a reference value, which is defined as a predetermined condition, as a data set common feature string. Then, the feature classifying unit 30524 refers to the intra-data group statistical information 3055 for each data group and classifies a string that appears in a larger number of data units than a reference value, which is defined as a predetermined condition, as a data group common feature string 404 for the data group. At this time, the feature classifying unit 30524 excludes a string extracted as a data set common feature string from processing objects. For each of data units included in the data group, the feature classifying unit 30524 classifies a string that is neither the above data set common feature string nor the data group common feature string among the strings extracted from the data unit as a data specific feature string for the data unit.

In the feature information store processing (step S507), the feature classifying unit 30524 stores data group common feature strings for each data group into the storage medium 400 and stores data specific feature strings 405 for each data unit into the storage medium 400. Upon completion of the processing of this step S507, all processing operations presented in FIG. 5 are completed. Subsequently, search processing is described.

Figure 7:
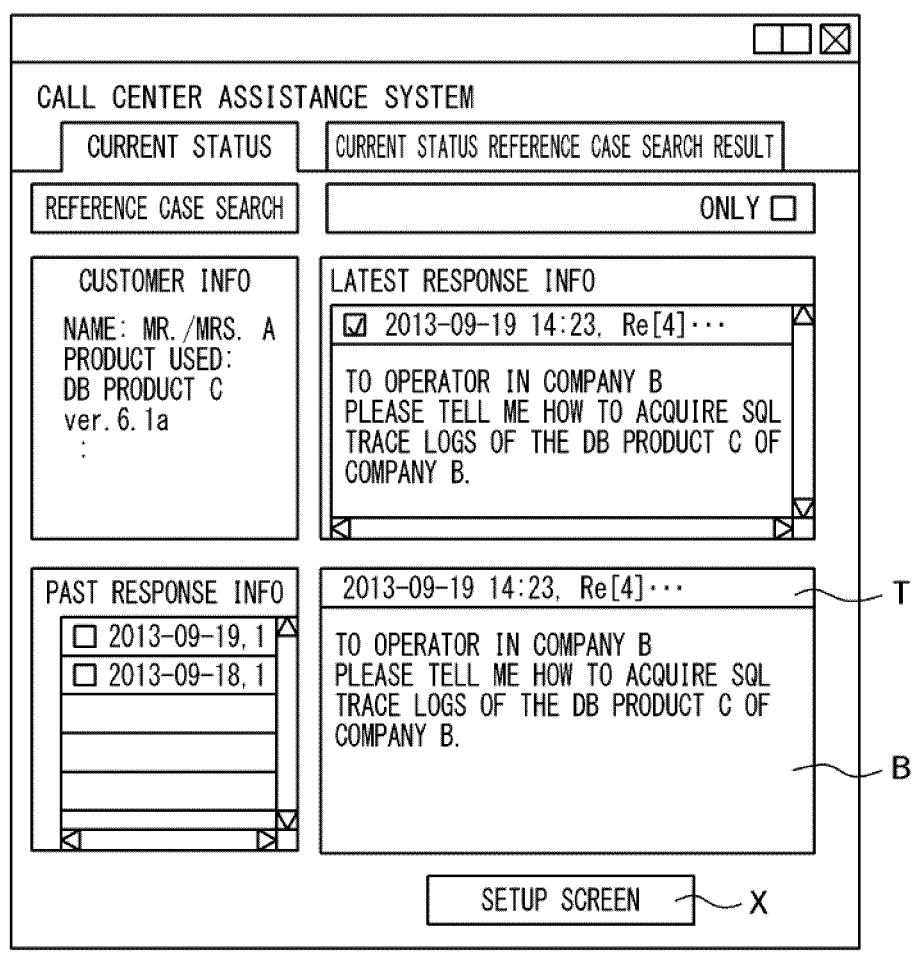
FIG. 7 is a diagram depicting an example of a search criteria input screen.

FIG. 6 is a flowchart illustrating a procedure of processing operations that are performed by each component of the search controller 3053. In the following, it is assumed that, according to a request via the input device 101 of the search client 100, an instruction to execute search processing is transmitted to the search server 300. An instruction to execute search processing is input by pressing an Execute Search button exemplified with "Reference Case Search" in a search setup screen which is depicted in FIG. 7 and will be described later or command input or any other input method and transmitted to the search server 300.

First, the system controller 3051 that received via the network port 306 an instruction to execute search processing from the search client 100 invokes the search controller 3053. The search controller 3053 invokes the search criteria receiving unit 30531, the unit for extracting string to search for 30532, the searching unit 30533, the data specific evaluation unit 30534, and the search result output unit 30535 in order. And, the search criteria receiving unit 30531 executes search criteria receive processing (step S601). In the search criteria receive processing, the search criteria receiving unit 30531 acquires search criteria entered at the search client 100 as search criteria specified via a search criteria input screen which is depicted in FIG. 7 and will be described later.

Once search criteria data entered through the search criteria input screen has been acquired, the unit for extracting string to search for 30532 executes processing to extract a string to search for (step S602). In the processing to extract a string to search for, the unit for extracting string to search for 30532 extracts a criteria string from the search criteria data acquired through the search criteria receive processing. While a string can be extracted by various methods, by way of example, a method described in Patent Literature 1 can be used.

Once a criteria string has been extracted, the searching unit 30533 executes search processing (step S603). In the search processing, the searching unit 30533 executes a full-text search through the data set to search 401 using the criteria string obtained through the processing to extract a string to search for as a search key and extracts a data group set including the criteria string. In the search processing, the efficiency of the search may be enhanced through the use of an index created by the index creation processing. Any type of index may be used and, if a small number of data units is stored as the data set to search 401, of course, no index may be used.

Following the execution of the search processing, the data specific evaluation unit 30534 executes data specific evaluation processing (step S604). For the data group set extracted by the search processing, the data specific evaluation unit 30534 executes data specific evaluation processing for each data unit included in each data group. Particularly, for each data unit, the data specific evaluation unit 30534 evaluates a degree of coincidence between a data specific feature string 405 included in the data unit and the criteria string extracted from the search criteria data. At this time, the data specific evaluation unit 30534 may weight a string using the weighting dictionary 406 and evaluate a degree of coincidence. The weighting dictionary will be explained with FIG. 9.

Following the execution of the data specific evaluation processing, the search result output unit 30535 executes search result output processing (step S605). In the search result output processing, the data units included in the extracted data, group set are rearranged in descending order of evaluation according to the evaluation through the data specific evaluation processing and transmitted to the search client 100. Upon completion of the processing of this step S605, all processing operations presented in FIG. 6 are completed.

FIG. 7 is a diagram depicting an example ox a search criteria input screen which is displayed on the output device 102 of the search orient 100. As depicted in FIG. 7, in the search criteria input screen, a plurality of tabs are provided; when a tab is specified, an item corresponding to the tab is displayed on the screen. In FIG. 7, a "Current Status" tab is specified and the current status of answer to a user's query is presented. For example, the "Current Status" tab provides information on a customer being answered and latest response information in which an inquiry mail from the customer and a response mail are displayed and, in addition, past response information in which a past inquiry mail from the customer and a response mail are displayed is included.

Also, checkboxes are provided in the latest response information and past response information sections. In an example presented in FIG. 7, when a checkbox is checked at the search client 100, the search criteria receiving unit 30531 outputs a screen that displays the corresponding mail title in a title display field T and displays the mail text in a text display field B. In a screen state depicted in FIG. 7, the latest response information is checked by default and, thus, the corresponding mail title and text are displayed in the respective fields.

When a "Reference Case Search" button or a "Current Status Reference Case Search Result" tab is pressed at the search client 100, the search controller 3053 receives an instruction to execute search processing. The respective components of the search server 300 execute the respective processing operations presented in FIG. 6 and a search result output screen which is depicted in FIG. 8 and will be described later is displayed.

Figure 8:
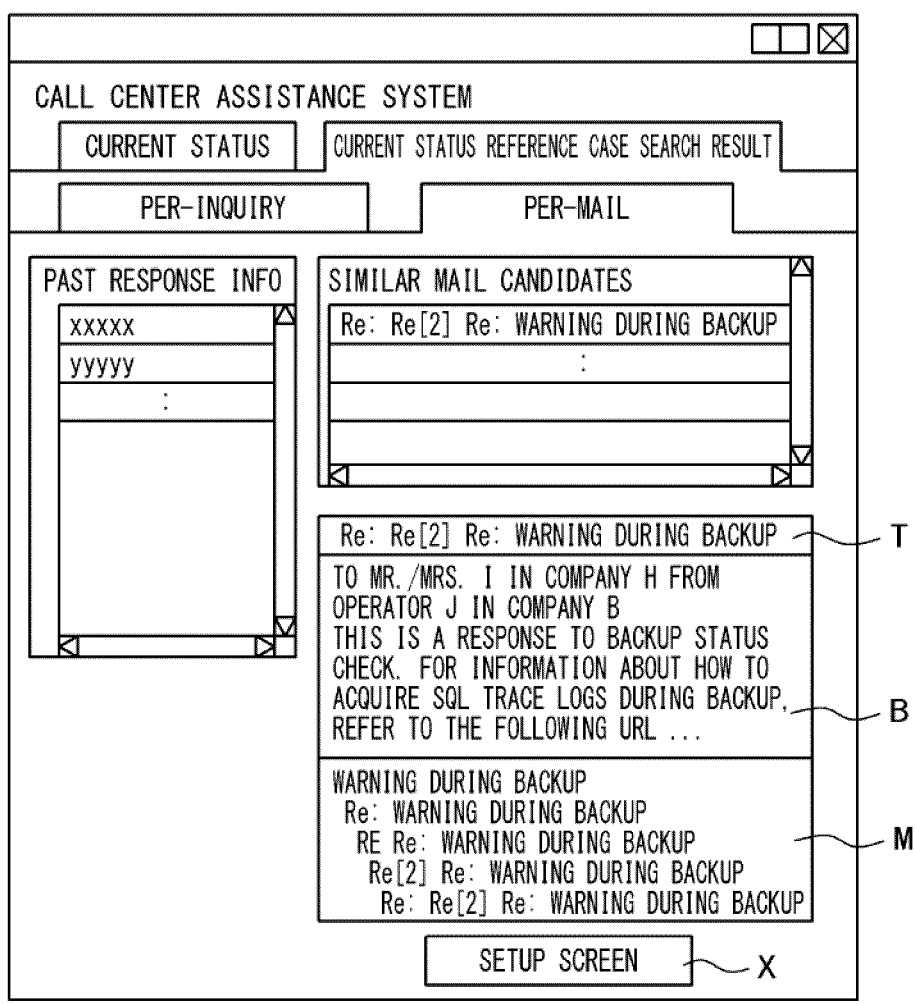
FIG. 8 is a diagram depicting an example of a search result output screen.

After search processing was executed by the "Reference Case Search" button actuation and the search result output unit 30535 displayed its result, in the search result output screen depicted in FIG. 8, if data search was successively executed with another search criteria, the search criteria receiving unit 30531 may acquire the previous search result content displayed in the search result output screen and make the content to be displayed with the "Current Status Reference Case Search Result" tab. It is also possible to execute a search by the searching unit 30533 on objects that are only past mails specified by checking the checkboxes.

A Setup Screen button X is also provided in the search criteria input screen to shift to a setup screen for search criteria data, so that a transition can be made to a criteria setup screen which is depicted in FIG. 9, as will be described later.

If the search criteria receiving unit 30531 received a plurality of mails as search criteria data, the unit for extracting string to search for 30532 may extract a string as search criteria data from each of the mails. After processing operations are executed by the searching unit 30533 and the data specific evaluation unit 30534, the search result output unit 30535 may display a plurality of search results on a per-mail basis. In this case, the search criteria receiving unit 30531 divides search criteria per mail in the search criteria receive processing (step S601) presented in FIG. 6, so that search processing is executed for each mail separately. Now, FIG. 7 is an example of the search criteria input screen and it is not indispensable to include all items. Subsequently, the search result output screen is described.

FIG. 8 is a diagram depicting an example of the search result output screen which is displayed on the output device of the search client. As depicted in FIG. 8, in the search result output screen, a "Per-Inquiry" tag and a "Per-Mail" tab are provided in addition to the "Current Status" and "Current Status Reference Case Search Result" tabs displayed in the search criteria input screen. When the "Current Status" tab is pressed, return is made to the search criteria input screen depicted in FIG. 7 and a transition is made to a state in which the search controller 3053 is ready to receive input.

The "Per-Inquiry" tab is a tab for displaying search criteria for processing execution and processing results when the search server 300 executes a conventional concept search. In this way, it is also possible to use both a search according to the present embodiment and a conventional concept search and compare their results. The "Per-Mail" tab is a tab for displaying a search result through the processing presented in FIG. 6 on a per-mail basis. As depicted in FIG. 8, under the "Per-Mail" tab, there are a Past Search Criteria field and a Similar Mail Candidates field. In the Past Search Criteria field, search criteria entered in the past via the search criteria input screen are displayed. When outputting a search result, the search result output unit 30535 invokes and displays the search criteria entered in the past via the search criteria input screen in the Past Search Criteria field.

In FIG. 8, a list of mail candidates which are output as a search result is displayed in the Similar Mail Candidates field. When one mail in the list is specified at the search client 100, the search result, display unit 30535 outputs a screen that displays the corresponding mail title in the title display field T and displays the mail text in the text display field B, as is the case for the search criteria input screen. In a screen state depicted in FIG. 8, a mail in the topmost position (the highest evaluated mail) is specified by default and, thus, the corresponding mail title and text are displayed in the respective fields.

When displaying the specified mail in the text, display field, the search result display unit 30535 may display a past data group (mail thread) M to which the mail belongs. In this case, past communication between the operator and the customer with regard to that mail can be checked easily. In the search result output screen, a Setup Screen button X is provided to shift to a setup screen with regard to a search result, as is the case for the search criteria input screen, so that a transition can be made to the criteria setup screen which is depicted in FIG. 9, as will be described later. Now, FIG. 8 is an example of the search result output screen and it is not indispensable to include all items.

As described in the beginning of this section, the past data group 1 presented in FIG. 2 is response records in which the operator replies to a problem with SQL trace logs and a phrase "SQL trace" appears in the respective past mails in this group. Because the phrase "SQL trace" appears in each past mail in this group, it is judged as a data group common feature string and the intra-data group appearance frequency calculation processing outputs a result of four appearances of the phrase "SQL trace" in the past data group 1.

Furthermore, in the feature classification processing, if the number of appearances of the phrase "SQL trace" in the past, data group 1 is larger than a reference value, which is defined as a predetermined condition, the phrase "SQL trace" is classifies as a data group common feature string for the past data group 1. On the other hand, for the past data group 2, a word "backup" which appears in the respective past mails in this group is classified as a data group common feature string.

Then, with respect to each past mail, a data specific feature string is determined. For example, for the past mail 1-4, the phrase "SQL trace" is not determined as a data specific feature string because it is a data group common feature string. For the past mail 2-4, the phrase "SQL trace" is determined as a data specific feature string because if is not a data group common feature string. Both the past mail 1-4 and the past mail 2-4 include the phrase "SQL trace" and it is possible to extract a string by a string extraction method which is set forth in Patent Literature 1.

In consequence, in the data specific evaluation processing presented in FIG. 6, if the search criteria data is the mail that "To operator in Company B: please tell me bow to acquire SQL trace logs of the DB product C of your company" specified in FIG. 7, the past mail 2-4 that includes the phrase "SQL trace" that is extracted from this mail as a data specific feature string is evaluated as data that is most similar to the search criteria and the past mail 2-4 is preferentially displayed in the Similar Mail Candidates field in FIG. 8. Subsequently, weighting strings is described.

FIG. 9 is a diagram depicting an example of a criteria setup screen for setting weights of strings. As depicted in FIG. 8, the criteria setup screen includes a "Weighting Setting" tab to give a weight to a string, an "Execute Index Creation" tab to request index creation, and an "Index Setting" tab to set an index that is used for data search by a conventional search function.

During search criteria setup with these tabs, the search criteria receiving unit 30531 may receive directly specified strings. With a Select File button Y1, data specific feature strings 405 and data group common feature strings 404 may be read, in and displayed on the screen. With an Output To File button Y2, set values may be stored into the weighting dictionary 406. Furthermore, an Undo button Y3 and a Redo button Y4 are provided to cancel a value setting and/or set a value again. With these buttons, the screen may be shifted backward or forward.

More specifically, there are three weights (degrees of importance) that are used in the data specific evaluation processing presented in FIG. 6. The first one is a weight of a data specific feature string that is included in each data. The second, one is a weight of a criteria string extracted, from search criteria data. The third one is a weight that has been set in the weighting dictionary 406.

First, a weight of a data specific feature string is described. A description is provided, taking up an example of a weight of the phrase "SQL trace" that was set as a data specific feature string for the past mail 2-4. A weight is determined based on the number of data units in which the phrase "SQL trace" appeared in the past data group 2 and the number of appearances of this phrase in the past mail 2-4. As an example of a method of calculating this weigh, the number of appearances of the phrase in the past mail 2-4 is divided by the number of data units in which the phrase appeared in the past data group 2. In this case, the weight of the phrase "SQL trace" that was set as a data specific feature string for the past mail 2-4 becomes 1 (=1/1).

Then, a weight of a criteria string extracted from search criteria data is described. As an example of a method of calculating this weight, the number of appearances of the string within the search criteria data may be used. In an example of search criteria data presented in FIG. 7, the weights of the phrase "SQL trace" and the phrase "DB product C" are each 1 and the weight of the phase "Company B" is 2.

Finally, a weight that has been set in the weighting dictionary 406 is described. This weight is used when there is knowledge, as know-how with respect to data, of a string that gives no information that characterizes data and, conversely, when there is knowledge of a useful string. In this example, the phase "Company B" is considered to be a string that gives no information that characterizes data. For the phrase "Company B", a weight of 0.1 which has been set in the weighting dictionary 406 is set in an "Entire Weight" column. The weight of 0.1 means that the phrase "Company B" is not a string that characterizes data and, thus, its weight is handled by a factor of 0.1. Conversely, a weight of two times is set for a string that characterizes data, such as "Solution Case". These values may be changed with a black arrows button in a Weight Change column or reverted with a black square button or values may be entered directly.

Then, a final weight is obtained by multiplying the set weight of a data specific feature string or the weight of a criteria string extracted from search criteria data (a value given as Current Condition in FIG. 9) by a weight which has been set in the weighting dictionary 406 (a value given as Entire Weight in FIG. 9). Although it was assumed in this example that evaluation is multiplied by a weight, another evaluation method may be applied. Weights set as Entire Weight are stored as the weighting dictionary 406 in the storage medium 400. In this way, in the weighting dictionary 406, data specific feature strings and criteria strings associated, with calculated weight values are stored in a table.

In the weighting dictionary 406, in addition to these strings and calculated weighted values, applied conditions associated with them may be stored. Applied conditions are conditions for making weighting effective. For example, a case is conceivable in which, when the phrase "DB product C" is included in search criteria, strings related to a "TABLE" database are weighted by 0.5. Applied conditions can be set through, e.g., an applied condition input field C which is presented in FIG. 9. If there are no applied conditions, "No Constraint" is displayed in the applied condition input field C. Now, FIG. 9 is an example of the criteria setup screen and it is not indispensable to include all items.

As described in the foregoing context, by executing the respective processing operations set forth in the present embodiment, a feature of each data unit is compared with a feature of any other data unit in a data group and a feature that does not exist in other data units is evaluated to be of a higher weight. Therefore, even if a concept search is performed, on a data set comprised of data groups including a plurality of features, data that, is more similar to an inquiry can be output in consideration of the features of the data groups. That is, it is possible to retrieve data including a suitable reply to a query through a concept search.

In the foregoing description, the group creating unit 30521 creates a set of data groups using group information created. However, a variation is conceivable in which one data unit is regarded as an already unified data group and data division information in which the positions of internal divisions of each data unit have been stored is used instead of group information. This is effective for, for example, a case where the call center receives a plurality of inquiries included in one mail, as presented in FIGS. 2 and 8.

Data division information is information in which the positions of internal divisions of each data unit have been stored in a case where one data unit (e.g. a mail) is regarded as an already unified data group. Data division information may be pre-stored in the storage medium 400 or may be created in such a manner that the data group creating unit 30521 analyzes a past mail or the search criteria receiving unit 30531 analyzes a mail that it has received.

For example, data division information is a table that associates a data ID with division positions of a data unit identified by the ID. For example, in order to divide a data unit identified by a data ID or #000001 is divided into first division data from the beginning to the 815-th character, second, division data from the 816-th character to the 2013-th character, and third, division data from the 2024-th character to the 2361-st character, these positions are stored as a list of division positions in the data division information. If a data unit is a mail, the mail text is divided into three parts at the above three positions and the intra-data group appearance frequency calculation processing S505, the feature classification processing S506, and the data specific evaluation processing S604 are executed for each division data.

For example, in the intra-data group appearance frequency calculation processing, the number of strings that appear in the mail divisions is obtained for each mail division. In the feature classification processing, the number of strings (partial data common string) which are a string that appears commonly in the mail divisions is calculated. If the number is larger than a reference value, which is defined as a predetermined condition, the string is classified as a string that represents a common feature for the mail (partial data common feature string). For each mail division, a string other than the partial data common feature string(s) is classified as a string that represents a feature specific to the mail division (partial data specific string). Furthermore, the data specific evaluation processing evaluates a degree of coincidence between a partial data specific string and a criteria string included in search criteria data received by the data search system is evaluated.

In this way, units in which data to search is grouped can be determined depending on the amount of data to be handled. For example, if a large number of data units are included in one data group, the processing operations can be executed for one certain data unit using division information.

Furthermore, another variation is conceivable in which data groups are created when a search is performed. In this variation, the data group creating unit 30521 and the feature classifying unit 30524 invoked by the index creation controller 3052 in FIG. 1 are invoked by the search controller 3053. The data group creation processing reads in data division information in instead of group information, regards each data unit included in a read-in data set to search as a data group, referring to the data division information predetermined, and creates division data into which the data unit was divided. As practical processing, the processing operations in steps S501, S504 to S506 presented in FIG. 5 are executed after the search processing in step S603 presented in FIG. 6 (before the data specific evaluation processing in step 604).

While, in the criteria setup screen presented in FIG. 9, setting a weighting value for each string was illustrated, categorizing strings and setting a weighting value for a unit of categorized strings may be performed or these ways of setting may be used in combination. FIG. 10 is a diagram depicting an example of a case of setting a weighting value for a unit of categorized strings. As depicted in FIG. 10, for example, the DB product C and other product names are set as one category (product name) in which these strings nave a common feature together and it is also possible to set weighting for each product name. In this case, categories may be set, for example, in such a way that the search criteria receiving unit 30531 may analyze and categorize strings according to a method that is set forth in Patent Literature 1. In this way, by categorizing strings, strings that fall in the same category can be lumped and weighted with a weighting value.

LIST OF REFERENCE SIGNS

1000 Search system
100 Search client
101 Input device
102 Output device
103 CPU
104 Main memory
105 Network port
200 Index creation requesting client 200
201 Input device
202 Output device
203 CPU
204 Main memory
205 Network port
300 Search server
301 Input device
302 Output device
303 CPU
304 Storage port
305 Main memory
3051 System controller
3052 Index creation controller
30521 Data group creating unit
30522 Index creating unit
30523 Feature extracting unit
30524 Feature classifying unit
3053 Search controller
30531 Search criteria receiving unit
30532 Unit for extracting string to search for
30533 Searching unit
30534 Data specific evaluation unit
30535 Search result output unit
3054 Intra-data set statistical information
3055 Intra-data group statistical information
306 Network port
400 Storage medium
401 Data set to search
402 Group information
403 Indices
404 Data group common feature strings
405 Data specific feature strings
406 Weighting dictionary
N Network

The invention claimed is:
1. A data search method for searching for a text group that is similar to an inquiry text from data storing a plurality of text groups into which a plurality of texts are grouped, the method comprising:
    obtaining, by a server comprising a processor and a memory, first information and an appearance frequency of the first information with respect to each of the text groups;
    determining, by the server, that the appearance frequency of the first information is less than or equal to a predetermined frequency;
    classifying, by the server, the first information as second information that is a search object responsive to the appearance frequency of the first information being less than or equal to the predetermined frequency;
    extracting, by the server, third information included in the inquiry text;

searching, by the server, for the third information from the second information with respect to each of the text groups; and outputting, by the server, the identifiers of a predetermined number of text groups with a higher number of hits on the third information included in the inquiry text.

2. The data search method according to claim 1, wherein the identifiers of the text groups are output based on weighting information representing a degree of importance of the second information.

3. The data search method according to claim 1, wherein a plurality of pieces of the second information taken as search objects are displayed on a display unit and an information piece selected from the pieces is set as the second information.

4. The data search method according to claim 1, wherein texts in a predetermined number of text groups with a higher number of hits on the third information are displayed on a per-mail basis on the display unit.

5. The data search method according to claim 1, wherein texts in a predetermined number of text groups with a higher number of hits on the third information are displayed on a per-inquiry basis on the display unit.

6. A data search system for searching for a text group that is similar to an inquiry text from data storing a plurality of text groups into which a plurality of texts are grouped, the system comprising:

a server comprising a processor and a memory, the server configured to:

obtain first information and an appearance frequency of the first information with respect to each of the text groups;

determine that the appearance frequency of the first information is less than or equal to a predetermined frequency;

classify the first information as second information that is a search object responsive to the appearance frequency of the first information being less than or equal to the predetermined frequency;

extract third information included in the inquiry text;

search for the third information from the second information with respect to each of the text groups; and output the identifiers of a predetermined number of text groups with a higher number of hits on the third information included in the inquiry text.

7. The data search system according to claim 6, wherein the server is configured to output the identifiers of the text groups based on weighting information representing a degree of importance of the second information.

8. The data search system according to claim 6, wherein the server is configured to display a plurality of pieces of the second information taken as search objects on a display unit and set an information piece selected from the pieces as the second information.

9. The data search system according to claim 6, wherein the server is configured to display texts in a predetermined number of text groups with a higher number of hits on the third information on a per-mail basis on the display unit.

10. The data search system according to claim 6, wherein the server is configured to display texts in a predetermined number of text groups with a higher number of hits on the third information on a per-inquiry basis on the display unit.

* * * * *